United States Patent [19]
Uhl

[11] 3,972,567
[45] Aug. 3, 1976

[54] APPARATUS FOR AND METHOD OF DISTRIBUTING PARTICLES OVER A ZONE

[75] Inventor: George A. Uhl, Markham, Ill.

[73] Assignee: Atlantic Richfield Company, Philadelphia, Pa.

[22] Filed: Feb. 7, 1975

[21] Appl. No.: 547,836

[52] U.S. Cl. .................... 302/61; 222/193; 239/654
[51] Int. Cl.² ........................ B65G 53/40
[58] Field of Search ............. 222/194, 193, 564; 239/654, 655; 302/53, 59, 61

[56] References Cited
UNITED STATES PATENTS

| | | | |
|---|---|---|---|
| 2,684,869 | 7/1954 | Lapple | 302/59 |
| 2,786,800 | 3/1957 | Myers | 302/53 |
| 3,854,637 | 12/1974 | Muller et al. | 222/564 |

Primary Examiner—Allen N. Knowles
Assistant Examiner—Hadd Lane
Attorney, Agent, or Firm—Frank J. Uxa

[57] ABSTRACT

An improved apparatus for distributing particulate material, e.g., comprising catalyst particles, over a zone, e.g., chemical reaction zone, wherein the apparatus is not centrally located with respect to the zone, comprising:

a supply hopper, having inlet means and outlet means, for holding particulate material;

a deflection plate located adjacent to the end of the outlet means away from the supply hopper to deflect the direction of at least a portion of the particulate material flowing through the outlet means;

at least two conduits in fluid communication with at least one source of gaseous media, each of the conduits being situated such that at least a portion of the gaseous media from the conduits flows in the space between the end of the outlet means away from the supply hopper and the deflection plate to thereby cause at least a portion of the particulate material to be propelled in substantially the same direction as the flow, provided that the gaseous media is expelled from at least two of the conduits at different, predetermined flowrates so that the particulate material is substantially uniformly distributed over the zone.

An improved method for distributing particulate material in a zone has also been discovered.

28 Claims, 5 Drawing Figures

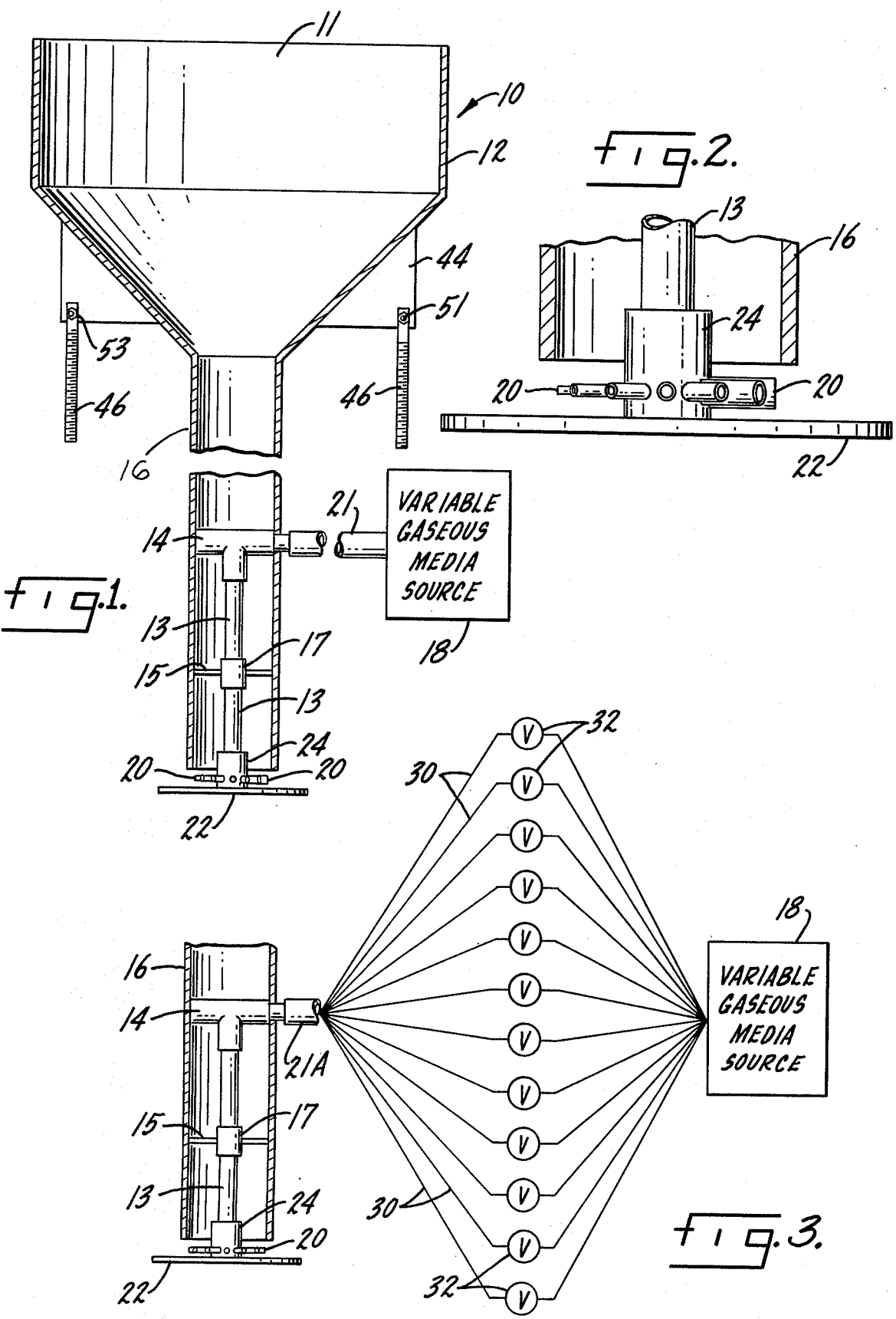

APPARATUS FOR AND METHOD OF DISTRIBUTING PARTICLES OVER A ZONE

The present invention pertains to a particle distributor. More particularly, the present invention pertains to an apparatus for distributing particulate material, such as catalyst, over a zone, such as a catalytic reactor.

In U.S. Pat. applications, Ser. Nos. 518,001 and 518,129, improved apparatus for distributing particulate material, such as catalyst particles, are disclosed. The present invention relates to a further improvement of such apparatus.

In many instances, because of the configuration of the zone into, i.e., over, which particulate material is to be distributed, it is either impossible or at least impractical to centrally locate the distribution apparatus. As used herein, the term "zone" refers to that volume or space into or over which particulate material is to be distributed. When the distribution apparatus is not centrally located, the particulate material distributed thereby may not be uniformly distributed over the cross-section of the zone. This is disadvantageous since substantially uniform distribution of the particulate matter over the cross-section of the zone is desired.

Therefore, one of the objects of the present invention is to provide an apparatus for distributing solid material, e.g., catalyst, over a zone, e.g., reaction zone.

Another object of the present invention is to provide an apparatus for distributing particulate solid material substantially uniformly over the cross-section of the zone when such apparatus is not centrally located.

A further object of the present invention is to provide an improved method for distributing solid particulate material over a zone. Other objects and advantages of the present invention will become apparent hereinafter.

An improved apparatus for distributing particulate material over a zone has now been found. In accordance with the present invention, the distribution apparatus, which is not centrally located, i.e., the distances between the center of the outlet means, described hereinafter, and at least two points of equal latitude on the sidewalls of the zone over which the particulate material is to be distributed are not equal, comprises a supply hopper, having an inlet and an outlet, for holding solid particulate material;

a deflection plate located adjacent to the end of the outlet means away from the supply hopper, i.e., termination of the outlet means, to deflect the direction of at least a portion of the particulate material flowing through the outlet means; and at least two conduits in fluid communication with at least one source of gaseous media, each of said conduits being situated such that at least a portion of the gaseous media flows from the conduits into the space between the termination of the outlet means and the deflection plate to thereby cause at least a portion of the particulate material to be propelled in substantially the same direction as the flow of gaseous media, provided that the gaseous media is expelled from at least two of the conduits at different predetermined flowrates so that the particulate material is substantially uniformly distributed over the zone.

Thus, it can be seen that by varying the amount of gaseous media expelled from different conduits, zones of widely differing sizes can be substantially uniformly covered with particulate material using a single, relatively small apparatus, which is not centrally located.

It is preferred that the deflection plate of the present apparatus have a configuration which can be substantially aligned with the configuration of the supply hopper outlet means. Although both the deflection plate and outlet means may have any configuration, more preferably both the deflection plate and the termination of the outlet means are circular in cross-section. Also, it is preferred that the deflection plate be larger in size than the cross-section of the outlet means. The cross-sectional area of the termination of the outlet means depends, for example, on the size of the particulate material to be distributed and the flow rate of particulate material desired in the outlet means. In a preferred embodiment, the termination of the outlet means has a cross-sectional area of at least about 20 in.$^2$, more preferably at least about 30 in.$^2$, and the deflector plate has a cross-sectional area of at least about 40 in.$^2$, more preferably at least about 50 in.$^2$. The deflection plate is preferably situated relative to the termination of the outlet means so that particulate material flows freely from the outlet means when gaseous media flows through the conduits and essentially stops when this gas flow stops. The distances between the termination of the outlet means and the deflection plate depends, for example, on the size of the particulate material being distributed. Preferably, this distance is at least about 0.5 inch, and preferably at least about 0.75 inch.

The present apparatus is useful in distributing any solid particulate material over a zone and it is particularly adapted to distributing solid catalyst particles into or over a reactor, e.g., chemical reaction zone. In certain instances, one structure, e.g., reactor, may include two or more zones over which solid particulate material, e.g., catalyst, is to be distributed. This situation may result from, for example, internal partition of the space within the structure into distinct zones, or the presence of internal hardware which form obstructions and, thus, restrict the solid particulate material from being distributed over the entire cross-section of the structure from a single point. In these instances, the position of the present apparatus can be adjusted or more than one of such apparatus can be employed to provide substantially uniform distribution of solid particulate material over each of the zones included in the structure.

The zone over which solid particulate material is to be distributed may have any cross-section configuration, e.g., circular, square, rectangular, elliptical, etc. In each instance where this cross-sectional configuration is other than circular, the present apparatus is not centrally located. Even if the zone has a circular cross-sectional configuration, the distribution apparatus may be not centrally located.

The gaseous media referred to above may be any substantially inert gaseous material, i.e., gaseous material which does not substantially harm either the distribution apparatus or the particulate material being distributed. Examples of such materials include the inert gases, i.e., helium, neon, argon and the like, nitrogen, mixtures of nitrogen and oxygen and mixtures thereof. Because of availability and convenience, the preferred gaseous media is air. The overall amount of gaseous media supplied to the conduits, i.e., the gross amount of gaseous media supplied to the total conduits, may be varied in a predetermined manner although this is not an essential feature of the present invention. The range of variable overall gaseous media flowrates may vary over a broad range. The range of variable overall flowrates chosen is dependent, for example, on the size of the zone over which the particulate material is to be distributed, the size and number of conduits, the size and weight of the particulate material to be distributed and the like. Preferably, the amount of gaseous media expelled from each of the conduits equals a time average flowrate of at least about 1.0 SCF/min. More preferably, the gaseous media is expelled from each of the conduits at a time average flowrate ranging from about 1.0 SCF/min. to about 100 SCF/min. or more. Standard conditions for measuring gas volumes are 60°F. temperature and one atmosphere pressure. If the zone over which the particulate material is to be distributed is itself at elevated pressure, the gaseous media is supplied to the conduits at an elevated pressure relative to the pressure in this zone.

The source of the gaseous media can be any means conventionally used to supply gases. For example, a reservoir, e.g., cylinder, of highly compressed gas can be used as the source. Also, a gas compressor can be used. Conventional valving arrangements can be employed to insure that the gaseous media is expelled from each of the conduits at the proper flowrate. Thus, the gaseous media flowrates from each of the conduits can be varied by manual manipulation of conventional valve means. In addition, the flowrates from each of the conduits can be varied by varying, in a predetermined manner, the cross-sectional area of the conduits.

The flowrates of gaseous media expelled from at least two of the conduits are varied in a predetermined manner to provide substantially uniform distribution of the particulate material over a zone. In certain instances, two or more conduits of the present apparatus may expel gaseous media at essentially the same flowrate. This embodiment is within the scope of the present invention provided that at least two conduits expel gaseous media at differing flowrates. The greater the flowrate of the gaseous media expelled from a conduit, the farther the solid particulate material is propelled. By varying the flowrate of the gaseous media expelled from the conduits, the distance through which the particulate material is propelled may be controlled, thus providing that the particulate material substantially uniformly covers the entire zone even though the present apparatus is not centrally located with respect to the zone.

The present distribution apparatus comprises at least two conduits situated such that at least a portion of the gaseous media flows from the conduits into the space between the termination of the outlet means and the deflection plate. The conduits are preferably substantially evenly spaced so that the distribution of solid particulate material is more easily controlled. In a preferred embodiment, the number of conduits ranges from about 4 to about 24, more preferably from about 8 to about 16. Although the outlets of the conduits may be situated at any horizontal level, it is preferred that these outlets be at substantially the same horizontal level. Although the dimensions of the conduit outlets is not critical to the present invention, it is preferred that the cross-sectional area of each conduit outlet range from about 0.001 in.$^2$ to about 0.1 in.$^2$, preferably from about 0.001 in.$^2$ to about 0.05 in.$^2$. As noted previously, the flowrates of gaseous media expelled from each of the conduits can be varied by varying the cross-sectional area of the conduits in a predetermined manner.

The pattern of variance of the flowrates of gaseous media expelled from the conduits of the present apparatus is predetermined. These flowrates are varied because the distribution apparatus is not centrally located. With the distribution apparatus being not centrally located, this apparatus must supply particulate material in a specific uneven pattern in order that this material be substantially uniformly distributed over the cross-section of the zone. Thus, the flowrates of gaseous media expelled from the conduits are varied in a predetermined, specific pattern so that varying amounts of particulate material are distributed to different portions of the zone. In general, as the distribution apparatus approaches being centrally located, the variance in flowrates decreases. The apparatus of the present invention is particularly useful in carrying out the process set forth in U.S. Pat. No. 3,668,115.

The apparatus of the present invention may be fabricated from any suitable material of construction. The material of construction used is dependent on the particular application involved. In many instances, metals and metal alloys, such as iron, carbon steel or stainless steel, copper and the like, may be used. Of course, the apparatus should be made of a material or combination of materials which is substantially unaffected by the particulate material and the conditions, e.g., temperatures, pressures and the like, at which the apparatus normally operated. In addition, such material or materials should have no substantial detrimental effect on the particulate material being processed.

These and other aspects and advantages of the present invention are set forth in the following detailed description and claims, particularly when considered in conjunction with the accompanying drawings in which like parts bear like reference numerals. In the drawings:

FIG. 1 is a partially broken sectional elevational view of a particulate distributor in accordance with the present invention.

FIG. 2 is a partial elevational view of the particulate distributor shown in FIG. 1.

FIG. 3 is a partial elevational view, partly in section, illustrating an additional embodiment of the present apparatus.

Figure 4:
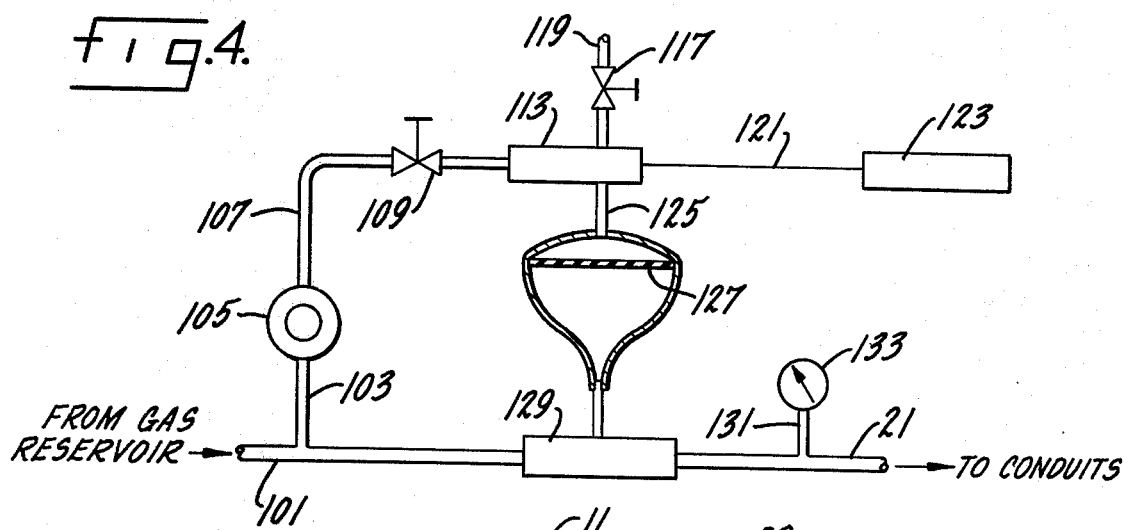
FIG. 4 is a schematic drawing of an automatic means to vary the overall flowrate of gaseous media supplied to the conduits of the present apparatus.

Particulate distributor 10 depicted in FIG. 1 includes supply hopper 12 which, for example, can be made of a sheet metal and can have a substantially frustoconical shape being larger at the upper end. Supply hopper 12 has inlet means 11 through which particulate material can be loaded. A vertical discharge pipe 16 is formed at the termination of supply hopper 12. The hopper 12 can be made of any desired capacity and can have a removable extension for its sides to increase its capacity. The upper end of the hopper 12 can have any cross-section, for example, a square cross-section or a circular cross-section. The capacity extension for the hopper can be mounted vertically or tangentially.

Gas pipe 13 is located, preferably centrally located, in discharge pipe 16. Gas header 21 provides fluid communciation between variable gaseous media source 18 and gas pipe 13. Gas header 21 can be made of flexible material so that gas pipe 13 and gaseous media source 18 may be removed from each other by relatively long distances which distances can be varied from time to time. Gas header 21 is connected to gas pipe 13 by means of standard T-fitting 14. Gas pipe 13 is supported within discharge pipe 16 by supports 15 and support adapter 17. Gas pipe 13 provides fluid communication between variable gaseous media source 18 and conduits 20. Conduits 20 are located in the space between the termination of discharge pipe 16 and deflection plate 22. Deflection plate 22 is attached, e.g., welded, to gas pipe 13 using adapter 24.

The termination of discharge pipe 16 and deflection plate 22 are both circular in configuration with deflection plate 22 being larger than the termination of discharge pipe 16.

Figure 5:
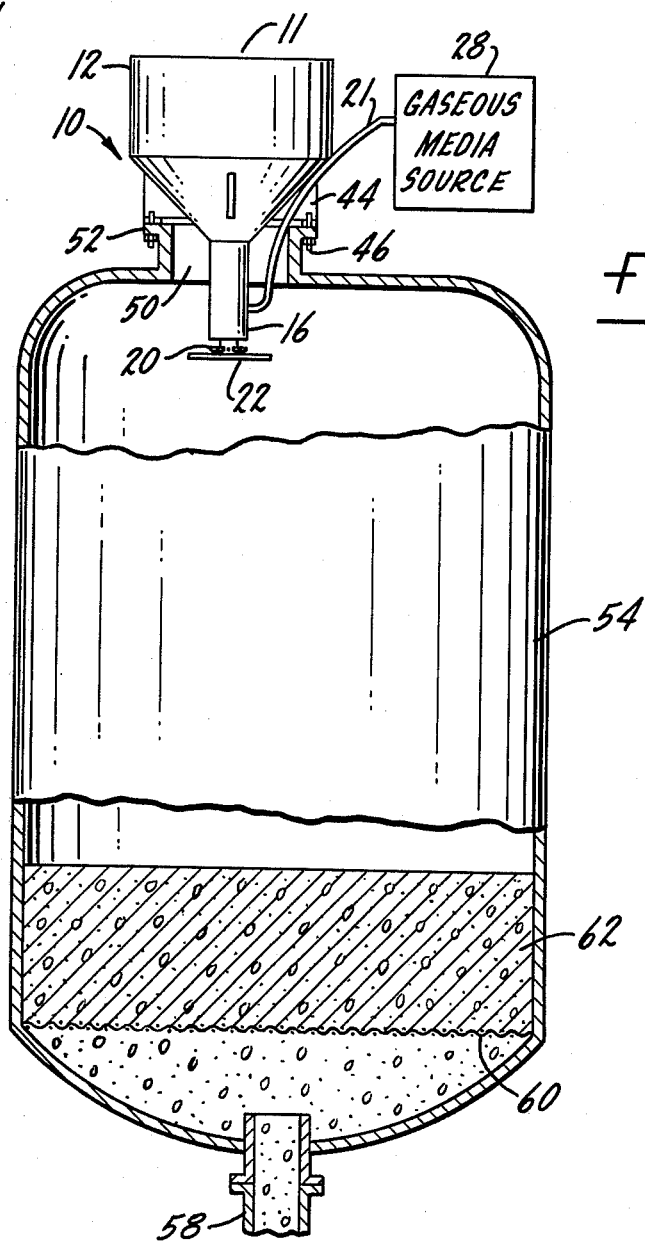
FIG. 5 is a sectional elevational view illustrating utilization of a particular distributor in accordance with the present invention to distribute catalyst material within a catalyst reactor.

FIG. 2 provides a close-up view of a portion of gas pipe 13, adapter 24, conduits 20 and deflection plate 22 of the embodiments of the present apparatus shown in FIGS. 1 and 5. As shown in FIG. 2, the conduits 20 have various cross-sectional areas and thus provide for different, predetermined amounts of gaseous media to be expelled from various of the conduits 20.

FIG. 3 illustrates an additional embodiment of the present apparatus in which a conventional valving arrangement is used to supply gaseous media at a predetermined variable flowrate to each of the conduits. FIG. 3 shows the bottom portion of discharge pipe 16, gas pipe 13, adapter 24, conduits 20, and deflector plate 22. Gas header 21A is in communication with standard T-fitting 14 which in turn is in communication with gas pipe 13. Twelve gas lines 30 are fitted into gas header 21A, standard T-fitting 14 and gas pipe 13. Each individual gas line 30 is in communication with a different conduit 20. Gas lines 30 are in fluid communication with variable gaseous media source 18. Conventional valve means, e.g., needle valves, 32 are interposed in each gas line 30 to individually regulate the flow of gaseous media from variable gaseous media source 18 through each gas line 30 to each of the individual conduits 20. By adjusting the positions of each valving means 32, the amount of gaseous media supplied to each conduit 20 can be individually varied. Gas header 21A, standard T-fitting 14 and gas pipe 13 act to protect gas lines 30, as well as providing means to keep gas lines 30 properly oriented. Gas lines 30 can be made of any suitable material, e.g., plastic tubing, metal tubing and the like. In the embodiment illustrated in FIG. 3, the cross-sectional area of the conduits 20 may be varied; however, it is preferred that each conduit 20 have substantially the same cross-sectional area.

In the embodiment shown in FIG. 1, variable gaseous media source 18 supplies gaseous media at a predetermined variable overall flowrate to conduits 20 by means of gas pipe 13 and gas header 21. Although a predetermined variable overall flowrate is preferred, this feature is not essential to the present invention. For example, in the embodiment shown in FIG. 5, the gaseous media source 28 supplies gas media at a substantially constant overall flowrate to the conduits 20. Variable gaseous media source 18 may involve a reservoir of highly pressurized inert gas, e.g., air, and a conventional valving arrangement which can be manually operated to supply gaseous media at the predetermined variable overall flowrate to conduits 20. As noted above, the overall gaseous media flowrate to conduits 20 can be varied using automatic means, i.e., means which do not require any direct human manipulation of the overall gaseous media flowrate. Such automatic means for varying gaseous flowrates are conventional and well known in the art. For example, such means may involve mechanical devices, such as cams, timers and the like, electrical and electronic devices, such as electrically responsive valves, computers and the like, or a combination of both mechanical and electrical and electronic devices.

FIG. 4 is a schematic drawing of one alternate and preferred embodiment by which the overall flowrate of gaseous media supplied to conduits 20 is automatically varied in a predetermined manner. In FIG. 4, air from a reservoir for holding air at an elevated pressure flows in line 101 toward diaphragm operated gate valve 129. A slip stream of this air flows in line 103 to air regulator 105 which acts to maintain a constant reduced pressure of air in line 107. Electrically responsive three way valve 113, acting in response to electrical device 123 through electrical line 121 controls the air pressure in line 125 to diaphragm 127. The position of diaphragm 127 determines the position of gate valve 129 and, thus, the flowrate of air through gate valve 129 into gas header 21. In this manner the air flowrate in gas header 21 may be varied. Pipe 131 provides fluid communication between gas header 21 and pressure gauge 133.

Elctrical device 123 may comprise, for example, a time programmed electrical switch which acts on valve 113 through electrical line 121 to control the pressure of air in line 125. The device 123 can be programmed in a predetermined manner to vary the overall amount of air supplied to conduits 20.

Operation of the automatic system shown in FIG. 4 is illustrated as follows. As the air pressure in line 125 increases, gate valve 129 opens allowing more air to flow from line 101 to gas header 21. With switch 123 in the closed position, electrically responsive three way valve 113 is positioned to provide fluid communication between lines 107 and 125. The air pressure in line 125 is essentially the same as the air pressure in line 107 and is maximized. Thus, the air flow from line 101 through gate valve 129 to gas pipe 21 is also maximized. After a predetermined period of time, time programmed switch 123 opens. An electronic signal is sent through line 121 to three way valve 113 causing valve 113 to position itself so that fluid communication between lines 119 and 125 is established and fluid communication between lines 107 and 125 is blocked. Since line 119 is at a reduced pressure relative to the pressure in line 125, air flows from line 125 through valve 113 to line 119. Thus, the pressure in line 125 and diaphragm 127 is reduced. In turn, gate valve 129 moves to a closed position to stop, or at least minimize, the flow of air from line 101 through gate valve 129 to gas pipe 21. After another period of time, time programmed switch 123 closes, thus causing valve 113 to change position so that fluid communication between lines 125 and 119 is blocked and communication between lines 107 and 125 is restored. Needle valves 109 and 117 in lines 107 and 119 respectively, can be adjusted to restrict the flow of air through these lines. In this manner, the rate at which gate valve 129 is opened and closed can be varied. The above cycle is continually repeated until the particulate material has been substantially evenly distributed over the zone.

In an alternate embodiment, valve 113, rather than being electronically responsive, is directly responsive to the movement of a cam rider. The properly shaped and sized cam revolves at a predetermined speed so as to move the cam rider and, thus, open and close valve 113 to, ultimately, vary the flowrate of gaseous media to conduits 20 in a predetermined manner. Other conventional and well known means for automatically varying the overall gaseous media flowrate supplied to the conduits can be used in conjunction with the present apparatus.

FIG. 5 illustrates operation of a particulate material distributor to distribute catalyst in a catalytic reactor in accordance with the present invention. Distributor 10 is not centrally located with respect to the zone over which catalyst is to be distributed. Distributor 10 is positioned to discharge catalyst through catalyst inlet 50 in the upper surface 52 of catalytic reactor 54. For this purpose particulate distributor 10 is provided with a plurality of support flanges 44 each of which may be equipped with a mounting bolt 46 to mount particulate distributor 10 to upper surface 52. Support flanges 44 also can be set directly on upper surface 52 with shims utilized to level hopper 12. As seen in FIG. 1, bolts 46 are connected to flanges 44 by means such as bolts 51 and nuts 53. Catalytic reactor 54 is of a cylindrical configuration, having a catalyst inlet 50 in its upper area. Reactor 54, for example, can include a reactor outlet 58, a support screen 60 to support catalyst material 62 a short distance above the lower surface of the reactor. Consequently, when the reactor 54 is in use, generally downwardly flowing reactant enters through, for example, the catalyst inlet 50, passes through catalyst material 62 and exits reactor 54 through reactor outlet 58 at or near the lower surface to reactor 54. Of course, reactors in which reactants normally flow in other than the generally downwardly direction, e.g., generally upwardly, generally radially and the like, may be loaded with particulate material using the present apparatus.

To charge reactor 54 with catalyst by means of particulate distributor 10, a quantity of the catalyst material is provided to supply hopper 12, and gaseous media source 28 is activated to supply air at a substantially constant overall flowrate to conduits 20. Catalyst flows from supply hopper 12 through discharge pipe 16 out of the bottom of discharge pipe 16 and into the path of the air flowing from conduits 20. The amount or flowrate (in SCF/unit time) of air expelled from each conduit 20 is approximately directly proportional to the cross-sectional area of such conduit 20. At least a portion of the catalyst is propelled by the predetermined variable air flowrates expelled from conduits 20 radially substantially in the direction of such flow so that the catalyst material is substantially uniformly distributed over the cross-section of reactor 54. The larger the air flowrate from an individual conduit 20, the farther the catalyst is propelled. So that, in the embodiment shown in FIG. 5, the conduits 20 with the larger cross-sectional area are directed toward sidewalls of reactor 54 farthest away from distributor 10. In this manner, catalyst is substantially uniformly distributed over reactor 54 even though distributor 10 is not centrally located with respect to reactor 54.

With the apparatus of the present invention, catalyst can be charged generally downwardly in reactor 54. Typically, reactors ranging in size from between about 1 to about 30 feet or more, preferably from about 3 to about 13 feet in diameter, and from about 2 to about 125 feet, more preferably from about 2 to about 50 feet, in length can be charged by the apparatus of the present invention. The catalyst is preferably charged to the reactor at a rate of fill of the reactor of up to about 17 vertical inches per minute, more preferably from about 1 to about 6 and still more preferably, from about 2 to about 4 inches per minute. The rate of fill of the reactor can be non-uniform, that is, the rate of fill can vary within the above range. It is preferred, however, that the rate of fill be uniform and that after a given rate of fill is established, that this rate of fill be maintained while adding particulate material to the catalyst bed. The catalyst particles are introduced into the reactor at a point such that the distance to the catalyst surface formed as the catalyst particles are introduced through a gaseous medium provides an average free fall distance of catalyst particles of at least about 1 foot, more preferably, an average free fall distance of from about 5 to about 125 feet and still more preferably, from about 10 to about 70 feet. In general, the minimum free fall distance provides for a downward velocity sufficient to orient the catalyst particle along the major axis of the catalyst particle, that is the free fall distance should be sufficient to provide for the catalyst particle to move a slight vertical distance upwardly after contact with the catalyst surface as the catalyst bed is formed. The orientation of the catalyst particle produced in this manner provides for the substantially horizontal orientation of the catalyst particles on an average basis in that the most probably orientation of the longitudinal axis of catalyst particles is horizontal. In addition, catalyst particles having a substantially horizontal orientation are defined herein to provide a catalyst surface which has a difference between the highest portion of the catalyst surface and the lowest portion of the catalyst surface which is less than 10 percent, more preferably less than 5 percent and still more preferably less than 1 percent. In other words, the catalyst surface is substantially flat.

A wide variety of solid catalysts can be distributed with the apparatus of this invention, for example, oxidation, hydrodesulfurization, hydrocracking, cracking, reforming and hydrogenation catalysts. Typical examples of hydrodesulfurization catalysts comprise any of the transition metals, metal oxides, metal sulfides, or other metal salts which are known to catalyze hydrodesulfurization, and are not poisoned by hydrogen sulfide or other sulfur compounds. The preferred catalysts comprise the oxides and/or sulfides, as for example, the oxides or sulfides of molybdenum, tungsten, iron, cobalt, nickel, chromium and the like. Vanadium compounds may also be employed in some cases. A particularly active combination consists of a Group VIB metal oxide or sulfide with a Group VIII metal oxide or sulfide. For example, compositions containing both molybdenum oxide and cobalt oxide, molybdenum oxide and nickel oxide, tungsten sulfide and nickel sulfide, and the like may be employed.

A particularly active catalyst consists of the composite known as cobalt molybdate, which actually may be a mixture of cobalt and molybdenum oxides wherein the atomic ratio of Co to Mo may be between about 0.4 to 5.0. This catalyst, or any of the above catalysts, may be employed in unsupported form, or alternatively it may be suspended on a suitable absorbent oxide carrier such as alumina, silica zirconia, thoria, magnesia, titania, bauxite, acid-activated clays, or any combination of such materials.

Typical examples of hydrocracking catalysts are crystalline metallic alumino-silicate zeolite, having a platinum group metal, e.g., platinum or palladium, deposited thereon or composited therewith. These crystalline zeolites are characterized by their highly ordered crystalline structure and uniformly dimensioned pores, and have an alumino-silicate anionic cage structure wherein alumina and silica tetrahedra are intimately connected to each other so as to provide a large number of active sites, with the uniform pore openings facilitating entry or certain molecular structures. It has been found that crystalline aluminosilicate zeolites having effective pore diameter of about 6 to 15 A units, preferably about 8 to 15A units, when composited with the platinum group metal, and particularly after base exchange to reduce the alkali metal oxide, e.g., $Na_2O$, content of the zeolite to less than about 10 weight percent, are effective hydrocracking catalysts.

Other catalysts are supported hydrogenation catalysts comprising a Group VIII metal in the Periodic Table, such as nickel, cobalt, iron or one of the platinum group metals such as palladium, platinum, iridium, or ruthenium on a suitable support. Generally, it is preferred that an oxide or sulfide of a Group VIII metal (particularly iron, cobalt or nickel) be present in mixture with an oxide or sulfide or a Group VIB metal (preferably molybdenum or tungsten). Suitable carriers or supports include acidic supports such as silica-alumina, silica-magnesia, and other well-known cracking catalyst bases; the acidic clays; fluorided alumina; and mixtures or inorganic oxides, such as alumina, silica, zirconia, and titania, having sufficient acidic properties providing high cracking activity.

In addition, the various metals and metal oxides and sulfides can be utilized on a mixture of support materials. Thus, for example, a zeolite and an alumina can be blended together as a support material in varying proportions which support materials contain various metals deposited thereon.

Typical examples of cracking catalysts are the well-known commercial varieties, e.g., Davison XZ-25, Aerocat Triple S-4, Nalcat KSF, Houdry HZ-1, etc. These catalysts are made up of a silica-alumina-zeolite base in particle sizes usually with a size range of one thirty-second to three-eights inch, suitably one-sixteenth to one-eighth inch, and containing rare earth metal oxides.

Typical compositions of the catalysts are the following: Davison XZ-25, a product of Davison Chemical Company, is mixed silica-alumina-zeolite cracking catalyst containing about 30–35 weight percent alumina, 18 weight percent zeolite X and about 2 weight percent cerium and 1 weight percent lanthanum. Aerocate Triple S-4, a product of American Cyanamid Company, is a silica-alumina-zeolite cracking catalyst containing about 32 weight percent alumina, 3 weight percent zeolite Y, 0.5 weight percent cerium and 0.1 weight percent lanthanum. Nalcat KSF, a product of Nalco Chemical Co., is a silica-alumina-zeolite cracking catalyst containing about 31–35 weight percent alumina, 11 percent zeolite X, about 1 percent cerium and 0.3 percent lanthanum.

Preferably supply hopper 12 can hold a substantial quantity of particulate material. Such material frequently comes in supply drums, and preferably supply hopper 12 can hold at least one drum of particulate material. Extensions can be added to the sides of supply hopper 12 to increase its capacity while still permitting ready transport and storage. The use of such extensions is facilitated if the upper end of supply hopper 12 has a square cross-section, rather than a circular cross-section.

As a specific example, a particulate distributor in accordance with the present invention can be provided with supply hopper 12 having at its upper end a square cross-section with each side in the order of 3 feet, and at its lower end a circular cross-section, with a diameter in the order of 6 inches of joined discharge pipe 16. The sides of such hopper 12 are inclined at an angle in the order of 30°. Discharge pipe 16 is circular in cross section and has a diameter on the order of six inches, while deflection plate 22 is also circular and has a diameter of about 10 inches. Twelve circular conduits 20 each have various inside cross-sectional areas ranging from about 0.002 in.$^2$ to about 0.04 in.$^2$. Deflection plate 22 is located so that the vertical distance between it and the termination of discharge pipe 16 is 0.75 inch. Gaseous media source 18 is, for example, an air compressor. The gaseous media source includes a valving arrangement as illustrated in FIG. 4, so that air can be supplied from gaseous media source 18 through gas pipe 13 to conduit 20 at a predetermined variable overall flowrate, e.g., from about 25 SCF/min. to about 100 SCF/min. Such a particulate distributor can readily distribute over a zone with a radius in the order of about 3 to 15 feet a particulate material such as a macrosize catalyst having a diameter in the range of from about one sixty-fourth inch to about one-fourth inch and a length in the range of from about one thirty-second inch to about one-half inch. Thus, it is seen that the particulate distributor according to the present invention provides outstanding benefits, e.g., substantially uniform particulate distribution over a zone, while being mechanically simple. For example, the present apparatus may involve no moving parts in the zone over which particulate material is to be distributed.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. Apparatus for distributing particulate material over a zone defined by sidewalls, said apparatus being located so that the distances between the center of an outlet means, described hereinafter, and at least two points of equal latitude on the sidewalls of said zone are not equal, comprising:

a supply hopper, having inlet means and outlet means, for holding particulate material;

a deflection plate located adjacent to the end of said outlet means away from said supply hopper to deflect the direction of at least a portion of said particulate material flowing through said outlet means when gaseous media is expelled by the conduits, described hereinafter; and at least two conduits in fluid communication with at least one source of gaseous media, each of said conduits being situated such that at least a portion of said gaseous media from said conduits flows in the space between the end of said outlet means away from said supply hopper and said deflection plate to thereby cause at least a portion of said particulate material to be propelled in substantially the same direction as said flow; provided that said gaseous media is expelled from at least two of said conduits at different, predetermined flowrates in different directions so that said particulate material is substantially uniformly distributed over said zone.

2. The apparatus of claim 1 wherein said particulate material comprises catalyst and said zone comprises a chemical reaction zone.

3. The apparatus of claim 2 wherein each of said conduits has substantially the same cross-sectional area.

4. The apparatus of claim 1 wherein at least two of said conduits have different cross-sectional areas.

5. The apparatus of claim 1 wherein the cross-sectional area of said deflection plate is larger than the cross-sectional area of the end of said outlet means away from said supply hopper.

6. The apparatus of claim 5 wherein both said deflection plate and the end of said outlet means away from said supply hopper are substantially aligned and substantially circular in cross-section.

7. The apparatus of claim 6 wherein said particulate material comprises catalyst and said zone comprises a chemical reaction zone and each of said conduits has substantially the same cross-sectional areas.

8. The apparatus of claim 6 wherein said particulate material comprises catalyst and said zone comprises a chemical reaction zone and at least two of said conduits have different cross-sectional areas.

9. The apparatus of claim 6 comprising from about 4 to about 24 said conduits.

10. The apparatus of claim 9 wherein each said conduit is circular in cross-section.

11. The apparatus of claim 10 wherein each of said conduits has substantially the same cross-sectional areas.

12. The apparatus of claim 10 wherein at least two of said conduits have different cross-sectional areas.

13. The apparatus of claim 11 wherein each said conduit has a cross-sectional area in the range from about 0.001 in.$^2$ to about 0.1 in.$^2$.

14. The apparatus of claim 12 wherein each said conduit has a cross-sectional area in the range from about 0.001 in.$^2$ to about 0.1 in.$^2$.

15. The apparatus of claim 13 wherein said particulate material comprises catalyst and said zone comprises a chemical reaction zone.

16. The apparatus of claim 14 wherein said particulate material comprises catalyst and said zone comprises a chemical reaction zone.

17. The apparatus of claim 1 wherein said gaseous media is air.

18. The apparatus of claim 1 wherein the overall gaseous media flowrate supplied to said conduits is varied in a predetermined manner.

19. The apparatus of claim 2 wherein said gaseous media is air and the overall air flowrate supplied to said conduit is varied automatically in a predetermined manner.

20. The apparatus of claim 7 wherein said gaseous media is air and the overall air flowrate supplied to said conduits is varied automatically in a predetermined manner.

21. The apparatus of claim 8 wherein said gaseous media is air and the overall air flowrate supplied to said conduits is varied automatically in a predetermined manner.

22. The apparatus of claim 15 wherein said gaseous media is air and the overall air flowrate supplied to said conduits is varied automatically in a predetermined manner.

23. The apparatus of claim 16 wherein said gaseous media is air and the overall air flowrate supplied to said conduits is varied automatically in a predetermined manner.

24. In a method for hydrocarbon conversion wherein hydrocarbon is contacted with hydrocarbon conversion catalyst particles in at least one chemical reaction zone to effect desired chemical reaction of said hydrocarbon, the improvement comprising using the apparatus of claim 2 to distribute said catalyst particles over said chemical reaction zone.

25. In a method for hydrocarbon conversion wherein hydrocarbon is contacted with hydrocarbon conversion catalyst particles in at least one chemical reaction zone to effect desired chemical reaction of said hydrocarbon, the improvement comprising using the apparatus of claim 7 to distribute said catalyst particles over said chemical reaction zone.

26. In a method for hydrocarbon conversion wherein hydrocarbon is contacted with hydrocarbon conversion catalyst particles in at least one chemical reaction zone to effect desired chemical reaction of said hydrocarbon, the improvement comprising using the apparatus of claim 8 to distribute said catalyst particles over said chemical reaction zone.

27. In a method for hydrocarbon conversion wherein hydrocarbon is contacted with hydrocarbon conversion catalyst particles in at least one chemical reaction zone to effect desired chemical reaction of said hydrocarbon, the improvement comprising using the apparatus of claim 15 to distribute said catalyst particles over said chemical reaction zone.

28. In a method for hydrocarbon conversion wherein hydrocarbon is contacted with hydrocarbon conversion catalyst particles in at least one chemical reaction zone to effect desired chemical reaction of said hydrocarbon, the improvement comprising using the apparatus of claim 23 to distribute said catalyst particles over said chemical reaction zone.

* * * * *